(12) United States Patent
Skovira

(10) Patent No.: US 7,523,305 B2
(45) Date of Patent: Apr. 21, 2009

(54) EMPLOYING CYCLIC REDUNDANCY CHECKS TO PROVIDE DATA SECURITY

(75) Inventor: Joseph F. Skovira, Owego, NY (US)

(73) Assignee: International Business Machines Corporation, Armonk, NY (US)

( * ) Notice: Subject to any disclaimer, the term of this patent is extended or adjusted under 35 U.S.C. 154(b) by 738 days.

(21) Appl. No.: 10/738,008

(22) Filed: Dec. 17, 2003

(65) Prior Publication Data

US 2005/0193193 A1   Sep. 1, 2005

(51) Int. Cl.
*H04L 9/00* (2006.01)

(52) U.S. Cl. ............ 713/160; 713/189; 713/162; 714/757; 714/758; 709/237; 705/50; 340/5.23; 717/126

(58) Field of Classification Search ......... 713/189, 713/160, 162; 714/758, 757; 709/237; 340/5.23; 705/50; 717/126
See application file for complete search history.

(56) References Cited

U.S. PATENT DOCUMENTS

| | | | |
|---|---|---|---|
| 4,346,474 A | 8/1982 | Sze | 371/49 |
| 4,397,020 A | 8/1983 | Howson | 370/105 |
| 4,543,657 A | 9/1985 | Wilkinson | 375/1 |
| 4,549,298 A * | 10/1985 | Creed et al. | 714/758 |
| 4,553,237 A | 11/1985 | Nakamura | 371/37 |
| 5,041,966 A | 8/1991 | Nakai et al. | 364/200 |
| 5,426,654 A | 6/1995 | Hayashi et al. | 371/37.1 |
| 5,612,683 A * | 3/1997 | Trempala et al. | 340/5.23 |
| 5,691,997 A | 11/1997 | Lackey, Jr. | 271/53 |
| 5,745,479 A * | 4/1998 | Burns et al. | 370/245 |
| 5,825,807 A | 10/1998 | Kumar | 375/200 |
| 5,896,374 A | 4/1999 | Okumura et al. | 370/311 |
| 5,991,911 A | 11/1999 | Zook | 714/758 |
| 5,996,105 A | 11/1999 | Zook | 714/755 |
| 6,047,395 A | 4/2000 | Zook | 714/756 |
| 6,048,090 A | 4/2000 | Zook | 371/37.4 |
| 6,052,815 A * | 4/2000 | Zook | 714/758 |
| 6,134,597 A * | 10/2000 | Rieth et al. | 709/237 |
| 6,243,372 B1 | 6/2001 | Petch et al. | 370/350 |
| 6,363,511 B1 | 3/2002 | Massoudi | 714/755 |
| 6,480,957 B1 | 11/2002 | Liao et al. | 713/170 |
| 6,701,479 B2 * | 3/2004 | Keller | 714/757 |
| 6,832,314 B1 * | 12/2004 | Irvin | 713/162 |
| 6,880,149 B2 * | 4/2005 | Cronce | 717/126 |

(Continued)

OTHER PUBLICATIONS

"The Great CRC Mystery," T. Ritter, Dr. Dobb's Journal of Software Tools, February. 11(2): 26-34, 76-83 (http://www.ciphersbyritter.com/ARTS/CRCMYST.HTM—pp. 1-10).

(Continued)

*Primary Examiner*—Kambiz Zand
*Assistant Examiner*—Kari L Schmidt
(74) *Attorney, Agent, or Firm*—Geraldine D. Monteleone, Esq.; Blanche E. Schiller, Esq.; Heslin Rothenberg Farley & Mesiti P.C.

(57) ABSTRACT

The security of data is enhanced by the use of cyclic redundancy checks. Data is encoded with one or more cyclic redundancy checks and then transmitted by a transmitter to a receiver. The receiver receives the encoded data and decodes it in order to use the one or more cyclic redundancy checks to determine whether the data was sent by an authorized user.

14 Claims, 5 Drawing Sheets

U.S. PATENT DOCUMENTS

| | | | | |
|---|---|---|---|---|
| 7,100,197 B2* | 8/2006 | Rail | | 726/3 |
| 7,178,033 B1* | 2/2007 | Garcia | | 713/184 |
| 7,219,237 B1* | 5/2007 | Trimberger | | 713/193 |
| 2003/0093381 A1* | 5/2003 | Hohl et al. | | 705/50 |
| 2003/0093751 A1* | 5/2003 | Hohl | | 714/781 |
| 2003/0154381 A1* | 8/2003 | Ouye et al. | | 713/182 |
| 2003/0165163 A1* | 9/2003 | Bader et al. | | 370/537 |
| 2004/0003330 A1* | 1/2004 | Block et al. | | 714/726 |
| 2004/0015691 A1* | 1/2004 | Collette et al. | | 713/161 |
| 2004/0107398 A1* | 6/2004 | Johnson | | 714/758 |
| 2004/0158793 A1* | 8/2004 | Blightman et al. | | 714/758 |
| 2004/0165542 A1* | 8/2004 | Ido et al. | | 370/252 |
| 2005/0102600 A1* | 5/2005 | Anandakumar | | 714/755 |

OTHER PUBLICATIONS

"Motorola Commercial, Government and Industrial Solutions Sector—MOSCAD Protocols," http://www.motorola.com/cgiss/moscad_proto.shtml, pp. 1-3.

"Motorola Commercial, Government and Industrial Solutions Sector—MOSCAD-M," http://www.motorola.com/cgiss/moscad-m.shtml, pp. 1-3.

"TDM Hand Held Wireless Display For Use With Telemetry Products," http://www.mantracourt.com/tdm.htm, pp. 1-2.

"EMR Radio & Telemetry—SCADA (Case Study)," http://www.emr-radio.ie/scada_study.htm, pp. 1-2.

"Implementation Of A Parallel Cyclic Redundancy Check Generator," Helness, Karl M., *Computer Design*, Mar. 1974, pp. 91-96.

"Robust Message Integrity For Fans 1 And CNS/ATM," Ingeburg L. Ray, 1996 UEEE, pp. 103-110.

"Two-Dimensional CRC for Efficient Transmission of ATM Cells over CDMA," Aykut Hocanin, Hakan Delic, Shanuj V. Sarin, IEEE Communications Letters, vol. 4, No. 4, Apr. 2000, pp. 131-133.

* cited by examiner

EMPLOYING CYCLIC REDUNDANCY CHECKS TO PROVIDE DATA SECURITY

TECHNICAL FIELD

This invention relates, in general, to data security, and in particular, to using cyclic redundancy checks to provide data security in the transmission of data from various types of devices, including remote devices.

BACKGROUND OF THE INVENTION

Data security is imperative in many technological fields, including electronic data transfers, data communications, networking, computing environments, as well as many other fields and/or environments. Data security includes the authentication of users or providers of the data. For example, in an electronic data transfer, the identification of the user requesting the transfer is authenticated, prior to the transfer, to ensure that the user is permitted to make such a transfer.

Over the last decade, user authentication in many fields or environments has steadily progressed, including in the field of communications. For example, there are many software-based techniques for authenticating users of computing infrastructure. However, there is at least one segment of communications that is lacking in authentication techniques. This segment includes wireless remote computer control of, for instance, complex utility networks (e.g., power grid controllers, water system controllers, etc.). Technicians routinely use computer uplinks in the field to adjust and control a number of events in such systems. Because these adjustments occur in real time, delays introduced by complex software authentication is prohibitive. In addition, field devices are small, run on low power and have limited programming capability. As a result, authentication techniques are lacking in such devices, as well as in other types of devices and/or environments.

Based on the foregoing, a need exists for an enhanced capability to provide data security. As one example, an enhanced capability is needed to provide data security for wireless and/or remote transmissions of data.

SUMMARY OF THE INVENTION

The shortcomings of the prior art are overcome and additional advantages are provided through the provision of a method of providing data security. The method includes, for instance, obtaining data, the data including one or more cyclic redundancy checks (CRCs); and using the one or more cyclic redundancy checks to determine the security of the data.

System and computer program products are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

In accordance with an aspect of the present invention, a capability is provided that enhances the security of data received by a receiver. Data security includes, for instance, authenticating the transmitter of the data and/or the transmitted data (referred to herein as authenticating the data). By providing this authentication, the receiver of the data can feel secure in acting on the data (e.g., following a command).

In one example, the data security capability includes encoding the data with one or more cyclic redundancy checks (CRCs), transmitting the encoded data to a receiver, and decoding by the receiver the data in order to use the CRCs to authenticate the data. The use of CRCs for data security is distinguished from the use of CRCs for data integrity. A CRC used for data integrity ensures that the data received is the same as the data sent. The data and CRC can be known (i.e., no security), but still have a CRC code to ensure that no bits have changed. In contrast, a CRC for data security is used to indicate whether the data is transmitted by an authorized user or whether the data is authorized (i.e., whether the data is secure).

Figure 1:
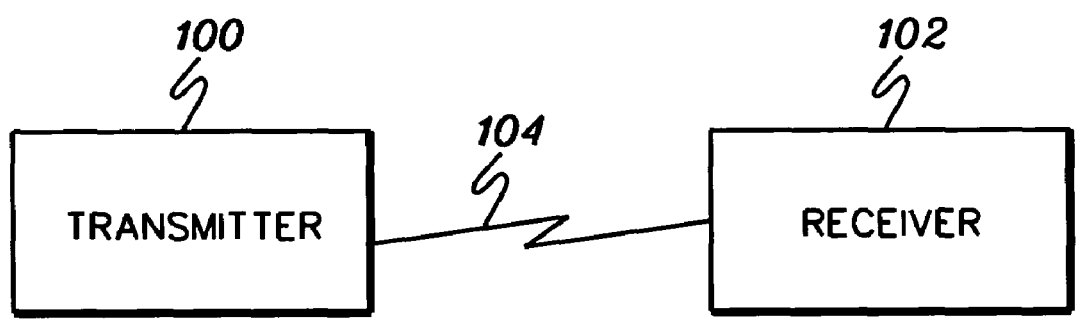
FIG. 1 depicts one embodiment of an environment incorporating and using one or more aspects of the present invention.

One embodiment of an environment incorporating and using one or more aspects of the present invention is depicted in FIG. 1. In one example, a transmitter 100 is coupled to a receiver 102 via a connection 104. In the example described herein, connection 104 is a wireless connection, and the transmitter is remote from the receiver. However, in other examples, connection 104 may be other than a wireless connection, and/or the transmitter and receiver may be local to one another. Many other variations are also possible and are considered a part of the claimed invention.

Figure 2:
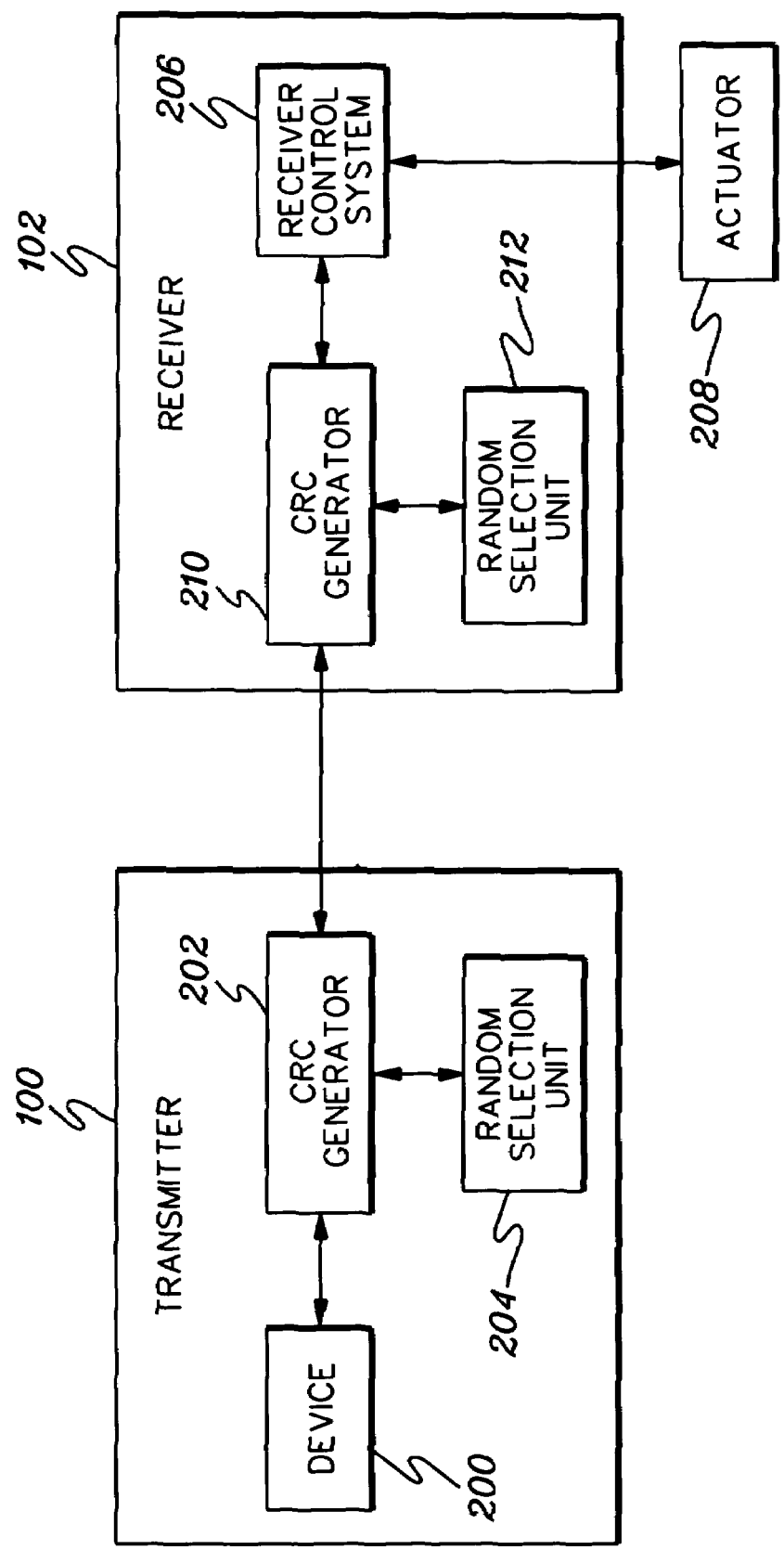
FIG. 2 depicts one embodiment of details associated with a transmitter and a receiver of FIG. 1, in accordance with an aspect of the present invention.

Transmitter 100 may be of various types of transmitting units. As one example, transmitter 100 includes a device 200 (FIG. 2) used in sending data to receiver 102. One example of such a device is a field communications device, which is remote from the receiver, and is used by, for instance, a field engineer to transmit commands to a control system. Many types of field communications devices can be used, including palm devices, laptop computers or notebook computers. One example of a field communications device is a TDM Hand Held Wireless Display offered by Mantracourt Electronics, Ltd., Devon, United Kingdom.

In accordance with an aspect of the present invention, device 200 is coupled to a CRC generator 202 employed to encode the transmission from the device. For instance, the CRC generator receives clear data (i.e., non-encoded data) from device 200 and encodes the data by adding one or more cyclic redundancy checks. The CRC generator may be a part of the device or separate therefrom. In one example, the CRC generator is coupled to a random selection unit 204 used to randomly select a CRC polynomial to be used to generate a CRC word used in encoding the transmission, as described in further detail below. Random selection unit 204 may be a part of CRC generator 202 or separate therefrom.

Receiver 102 receives the encoded data from the transmitter. Similar to the transmitter, receiver 102 may be of various types of receiving units. As one example, the receiver includes a receiver control system 206, such as a control system for a utility or power facility or for a water plant. The control system is capable of receiving commands (e.g., a computer) and acting thereon. As one example, the receiver control system is coupled to an actuator 208 used to control physical devices, such as for instance, a pressure valve in a water filtration system. Receiver control system 206 is further coupled to a CRC generator 210. The CRC generator receives the encoded data from the transmitter, decodes the encoded data returning it to its clear state, and forwards the clear data to the receiver control system, assuming the CRC check is valid. CRC generator 210 may be a part of receiver control system 206 or separate therefrom. In one example, CRC generator 210 is coupled to a random selection unit 212, which is used in selecting the appropriate CRC polynomial to decode the encoded data, as described in further detail below. Random selection unit 212 may be a part of CRC generator 210 or separate therefrom.

In one embodiment, CRC generator 202 and CRC generator 210 include similar circuits enabling each of units 100 and 102 to act as a transmitter and/or a receiver. Thus, reference herein to a CRC generator includes CRC generator 202 and CRC generator 210. However, the functions that each perform at any particular time depend on whether it is acting as a transmitter or receiver. The CRC generator includes circuitry to add one or more cyclic redundancy checks to encode the data or to remove the one or more cyclic redundancy checks to decode the data. The basic computation of a CRC involves the selection of a CRC polynomial, which is then applied to the data stream. There are several criteria for selecting a CRC polynomial, which determine characteristics of the length of the data word and a degree of desired security. By applying the cyclic redundancy check to the data, the only way to generate a correctly transmitted message is to know the correct data stream and the CRC polynomial in use. Thus, attempts to break into the system through random transmissions result in failure of the CRC check, thus detecting the break-in.

Various embodiments are possible to encode a transmission with one or more CRCs to provide data security. For example, a fixed CRC word can be added to a clear communication. However, if the CRC polynomial used to generate the fixed CRC or if the fixed CRC is discovered and the clear message text is known, system break-ins could occur. To increase this initial security, selection of the CRC word is randomized. There are, for instance, two techniques for randomizing the CRC word selection. The first technique includes using a synchronized clock by the transmitter and receiver which acts as an initial seed in a random number generator. That is, the transmitter and receiver select an identical random number for a given transmission. This technique further includes choosing a fixed clock resolution (e.g., 10 seconds, one minute, etc.) for switching to the next random number generation.

A second technique includes using an on-demand random generator in the transmitter to randomly select a random number for a given transmission. The random number is selected and then communicated to the receiver. The transmitter and receiver configure the CRC circuitry identically for a given message, and each message generates an alternate configuration.

By using a random number to select different CRC polynomials, security is increased. For example, assume a set of 16 polynomials is used to select CRC coding randomly for a given message. If the clear text and polynomial set are known, it will take, on average, eight random tries to generate the correct message. Although security is enhanced, it still can be further improved. As one example, a plurality of CRCs are applied to the data. For instance, each CRC generator adds one or more horizontal CRCs to the data, as well as one or more vertical CRCs, as described further with reference to FIG. 3.

Figure 3:
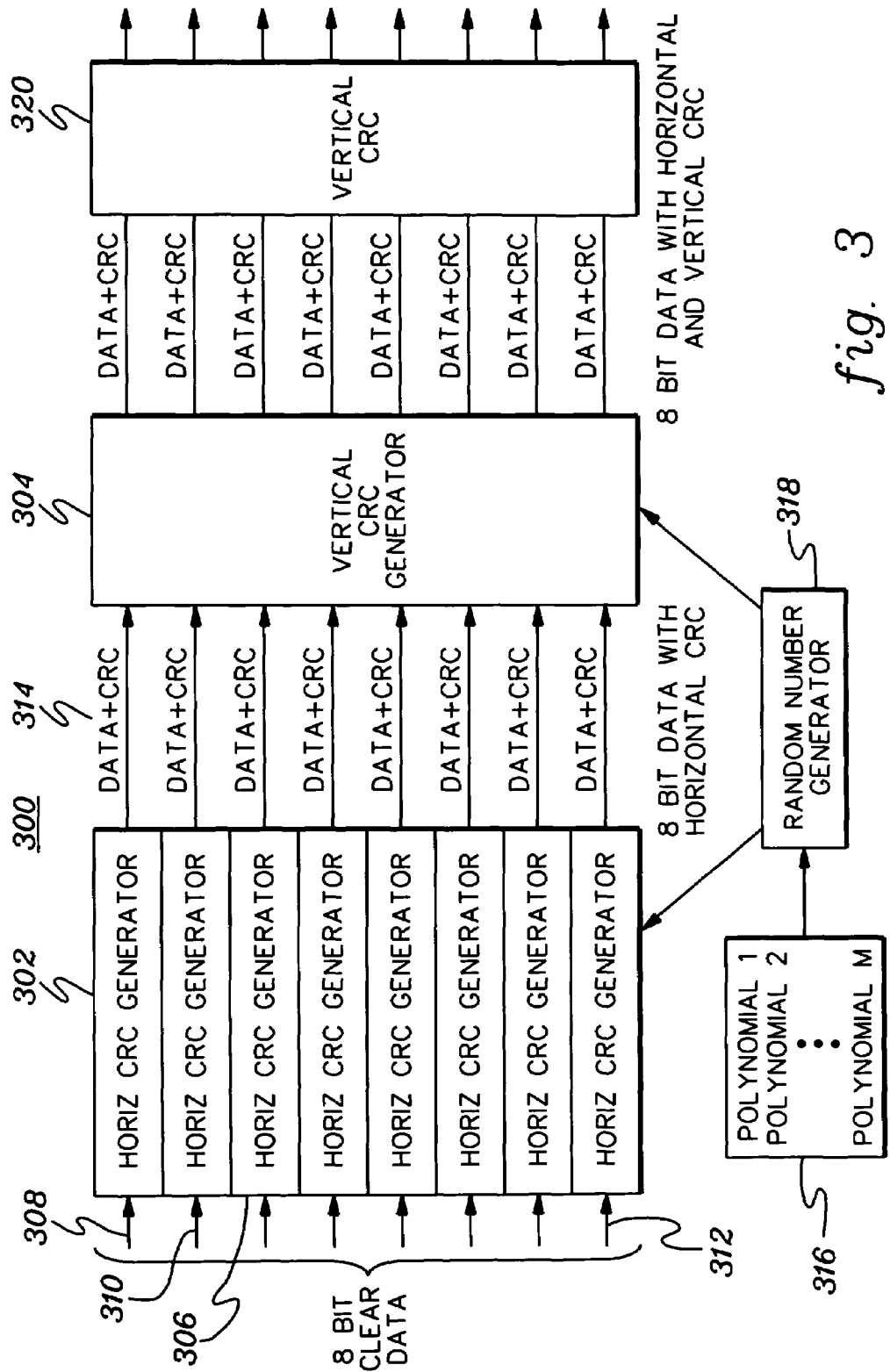
FIG. 3 depicts one embodiment of a cyclic redundancy check generator employed to produce/retrieve the cyclic redundancy checks used for data security, in accordance with an aspect of the present invention.

Referring to FIG. 3, a CRC generator 300 includes, for instance, a horizontal CRC generator 302 coupled to a vertical CRC generator 304. Horizontal CRC generator 302 includes, for instance, a plurality of generators 306 used to generate a plurality of CRCs for a particular message. In the example depicted herein, there are eight generators 306, and therefore, horizontal generator 302 accepts as input 8 bit data from the device. Thus, each byte of data from an N byte message is input to the generator, such that each bit of the data byte is input into a respective horizontal CRC generator 306 based on its position. For instance, bit 0 of each byte is input to a first generator 308; bit 1 of each byte is input to a second generator 310; . . . ; and bit 7 of each byte is input to a last generator 312. Each generator 306 receives N bits of data (e.g., N bit data stream) and produces an 8 bit CRC, as described further below. Thus, an output 314 of each generator 306 is an N bit data stream plus a CRC word.

Each CRC word is generated using one or more circuits designed based on a CRC or generator polynomial. The chosen polynomial is selected from a plurality of polynomials 316 that have been selected based on a set of criteria. For example, as the degree of the polynomial determines the length of the CRC, for these implementations, degree 8 polynomials are selected (giving 8 bit CRC characters for serial and parallel implementations). Another characteristic of the polynomial is that the exponent determines the capability of error detection and correction. The greater the degree of correction and detection, the more difficult it would be to randomly create the correct data and CRC word. A careful selection of polynomials with good error detection and correction characteristics implies that these polynomials will perform better in a data security application. Thus, polynomials with a larger exponent are to be selected, in this embodiment. Further details regarding exponent and degree of generator polynomials are included in "The Great CRC Mystery," T. Ritter, Dr. Dobb's Journal of Software Tools, February. 11(2): 26-34, 76-83, which is hereby incorporated herein by reference in its entirety.

The plurality of polynomials 316 is input to a random number generator 318. The random number generator is used to randomly select a particular polynomial from the plurality of polynomials (e.g., 16) to be used by one of the horizontal generators. Since there are eight horizontal generators (i.e., an 8-bit transmission system), in this embodiment, eight polynomials are selected, one for each generator. By selecting a different CRC polynomial, different CRC characters result.

In one example, each horizontal generator 306 includes circuitry to implement the various polynomials. Thus, the data bit stream being fed into the horizontal generator is input to the particular circuit implemented for the selected polynomial. For instance, if polynomial $G(x)=x^8+x^4+x+1$ is selected, then the data is input to a circuit 400 (FIG. 4) of the generator.

Figure 4:
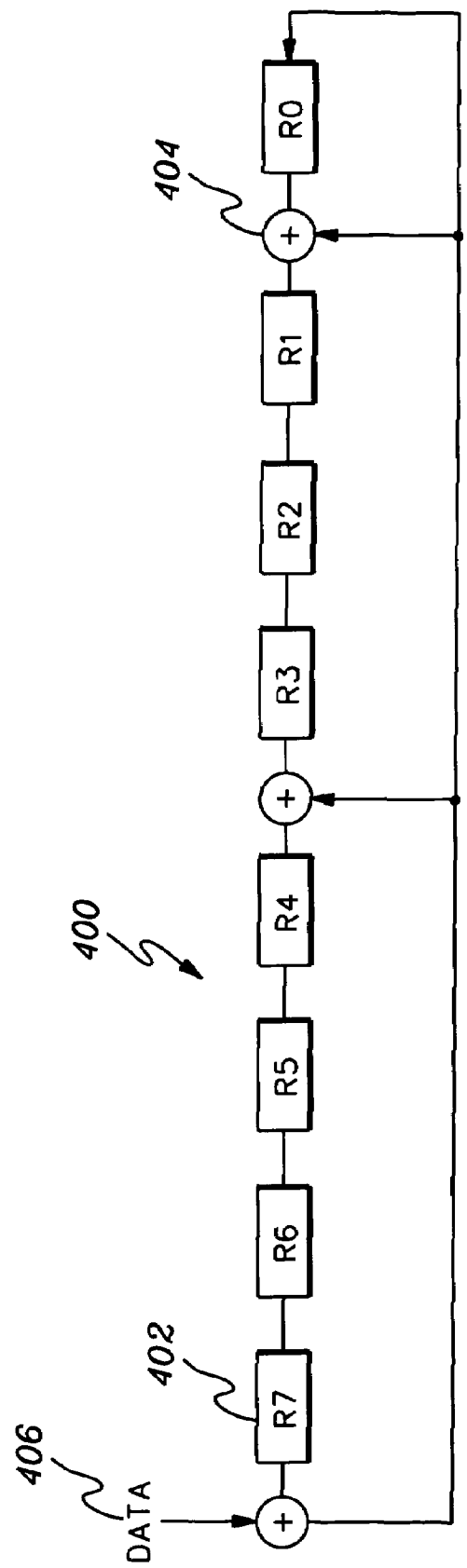
FIG. 4 depicts one embodiment of a circuit used to produce/retrieve a plurality of horizontal cyclic redundancy checks, in accordance with an aspect of the present invention.

Referring to FIG. 4, circuit 400 includes a plurality of single bit latches 402 that together form an 8-bit shift register. The "+" operations 404 are exclusive OR gates. A data input 406 receives as input the data bits coming in from device 200 (FIG. 2) on an input line (e.g., 308 (FIG. 3), 310, 312, etc.) corresponding to this generator.

Initially, each latch is cleared to a zero state. As a data bit is input to the register, a shift occurs from one latch to the next. Once the last bit of a data stream is entered (e.g., end of message is signaled), the value of the eight bits in the shift register represents the 8-bit CRC character, which is appended to the data stream that was just received. The generation of horizontal CRC can occur at data path clock speeds, since simple exclusive OR gates and shift registers are used.

Returning to FIG. 3, the output of horizontal generator 302, which includes a plurality of data streams+CRCs 314, is input to vertical CRC generator 304. The vertical CRC generator generates a vertical CRC 320 for the entire message (e.g., N bytes+8 bytes), which is appended, for instance, at the end of the message as word N+9.

To generate the vertical CRC, a polynomial is randomly selected by random number generator 318 from the plurality of polynomials 316. Thus, in this embodiment, for 8-bit data, 9 random numbers are generated: one for each of the horizontal CRCs generators and one for the vertical CRC generator. In one example, the 8 random numbers for the horizontal generators are to be unique, but the one for the vertical generator may be the same as one of the numbers for the horizontal generators. Each of the random numbers (RNs) is scaled to the length of the polynomial table. For example, assuming RN is between 0 and 1, and 16 polynomials are in use, the computation, Index=floor (RN*16), generates an index from 0-15. This index is used to select one of the 16 polynomials to use at the selected position.

The vertical CRC is generated, for instance, in parallel. Assuming the device moves data over an 8-bit pathway, the parallel CRC is generated in 8-bit parallel fashion. To illustrate by example, consider a system with an 8-bit data path using the same generator polynomial as the horizontal CRC (e.g., $G(x)=x^8+x^4+x+1$). In parallel, the register bits are R0 through R7; the parallel data bits (for one clock cycle) are D0 through D7; and on the next clock cycle, the register outputs are fed back into the CRC generator and are designated C0 through C7. These values are used in the following parallel equations, which are illustrative for an 8-bit example:

$R0=D7+C0+D3+C4+D0+C7$ $R1=D6+C1+D2+C5+D7+C0+D3+C4+D0+C7$ $R2=D5+C2+D1+C6+D6+C1+D2+C5$ $R3=D4+C3+D0+C7+D5+C2+D1+C6$ $R4=D4+C3+D7+C0$ $R5=D3+C4+D6+C1$ $R6=D2+C5+D5+C2$ $R7=D1+C6+D4+C3$

Figure 5:
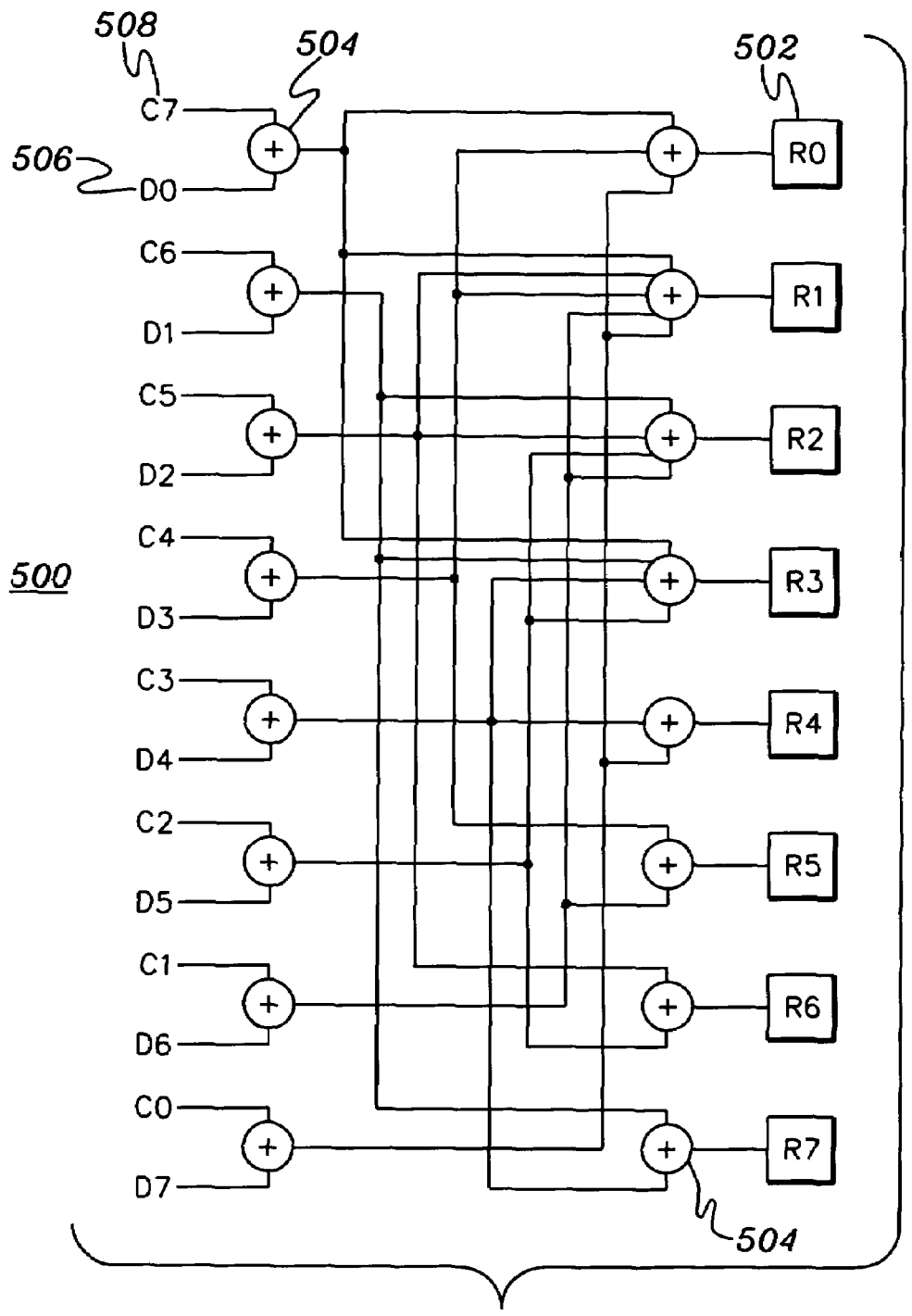
FIG. 5 depicts one embodiment of a circuit used to produce/retrieve a vertical cyclic redundancy check, in accordance with an aspect of the present invention.

One example of an implementation of the parallel 8 bit equations is depicted in FIG. 5. As shown, a circuit 500 includes a plurality of single bit latches 502 and exclusive OR gates 504. There are, for instance, two inputs to the circuit. One input is a data input (D) 506, which receives as input the data bits output from the horizontal CRC generators (e.g., data and CRC). For instance, D0 receives as input data output from the first horizontal CRC generator; D1 receives as input data output from the second horizontal CRC generator; etc.

Another input (C) 508 receives as input the output from latches 502, which is fed back into the circuit. For instance, C7 receives as input the output from R7; C6 receives as input the output from R6; etc. When a clock within the latch triggers, the data bit of the latch is fed into its corresponding C input.

The data flows through the latches until an end of message signal is received. At that time, the data in the latches is dumped and this byte of data corresponds to the vertical CRC word, which is appended at the end of the entire message (i.e., data (N bytes)+CRCs (8 bytes)). So, the length of the message is now N+8+1 bytes, where N equals the length of the original message, 8 represents the 8 horizontal CRCs embedded within the message, and 1 represents the 1 vertical CRC appended to the end of the message.

Further details regarding the implementation of parallel CRC generators are described in "Implementation of a Parallel Cyclic Redundancy Check Generator," K. Helness, 1974, *Computer Design*, March, 91-96, which is hereby incorporated herein by reference in its entirety.

As described above, by using the horizontal and vertical CRC generators, the encoded message includes a plurality of 8 bit data streams, each including a horizontal CRC, and a vertical CRC added to the end of the message. Each message may have a different code. To accomplish this, the random number generator is used to direct the CRC generation circuitry in a random selection of CRC polynomials to use for the current transmission. The programmable hardware is configured for this CRC generation and the message is encoded and then sent. For the next message, an additional nine random numbers are selected and the process is repeated. Because the system uses hardware CRC generation, it is fast enough for real-time verification of field devices.

The security characteristics associated with using CRC to provide data security can be quantified at a number of levels. For instance, because variable CRC polynomials are used, it is extremely difficult to randomly establish the correct communication code. Not only would one have to randomly generate the correct communication code, one would have to randomly establish the correct CRC values. For example, assume that knowledge of the system is obtained, including the correct command sequences, and the CRC polynomials in use, it would still take a 1 in 34 billion chance of breaking into the system. Take the following example: Given eight data bits, D=8, P=16 polynomials to select from, and a selection of D+1 polynomials for use in transmission, the number of possible combinations (selected without elimination from the complete polynomial sets) is:

$$S(P,D+1)=P^{(D+1)}=16^{(8+1)}=16^9=68,719,476,736.$$

On average, the correct polynomial selection is chosen at (16**9)/2=34,359,738,368. That is, an unauthorized communication using known command codes and with a list of the 16 polynomials used by the system would have a 1 in 34 billion chance of breaking into the system.

As an alternative, if polynomials are selected and used only once, the security characteristics of this technique are slightly different. For instance, given 16 possible polynomials, if 9 are selected (8 serial plus one parallel), 8 are selected without reuse (for the serial CRC) and 1 from the possible 16 parallel implementations. Therefore, the number of possible combinations drops from $16^9$ to $(16!-7!)*16=66,421,555,200$ giving an average chance of selecting all 9 polynomials at random of 66,421,555,200/2=33,210,777,600, or a one in 33 billion chance of guessing correctly.

Thus, if a reasonable retry limit (say 16 to 256 retries) is used at the receiver, an unauthorized entry, even one using a large amount of partial information, would have quite a low probability of finding the correct combination. Further, the same probability applies to each message. Since the hardware selects a different set of polynomials for each message, no security knowledge is maintained from one message to the next.

There are, for instance, two techniques for implementing the random selection of CRC polynomials. One technique includes implementing the possible serial and parallel realizations of the polynomials in programmable logic (for example, products from Xilinx). The designs are indexed, then selected depending on the random number. Upon selection, the module is personalized (e.g., programmed) with the appropriate design which is stored for later use. Using this technique, the same design is usable multiple times, since the module may be programmed to any designs, restricted only by capacity.

An alternate technique includes implementing the parallel and serial designs in Very Large Scale Integration (VLSI) logic. In this implementation, the data paths are selected by the random numbers. For example, polynomial 15 might be selected for use with data input 1, which implies that data input 1 is routed through the serial VLSI implementation for polynomial 15. This technique avoids any personalization delays that may be associated with programmable logic.

In accordance with an aspect of the present invention, the transmitter uses a CRC generator to encode a message with a plurality of CRCs and then transmits the encoded message to a receiver. In response to receiving the encoded message, the receiver decodes the message to extract the clear text and to determine whether the data is secure.

To decode the encoded message, the receiver uses its CRC generator. In one embodiment, the CRC generator of the receiver is the same as the generator of the transmitter. The generator of the receiver is used in reverse to decode the message. For instance, the message, which includes the N bytes of data, 8 bytes of horizontal CRC and 1 byte of vertical CRC, is first input to the vertical CRC generator. Initially, the data portion of the message (e.g., N bytes) flows through the vertical CRC generator. In one example, the data portion is included in a fixed sized packet, such that the vertical CRC generator recognizes the end of the packet. Next, the additional 8 bytes of horizontal CRC and 1 byte of vertical CRC is passed through the circuit, which is understood by the generator to be CRC data.

The output of the vertical CRC generator is input to the horizontal CRC generator. For instance, as the data and horizontal CRC flows through the vertical CRC generator, they are input to the horizontal CRC generator. The vertical CRC is not input, in this example. As the data flows through the horizontal CRC, it is forwarded to a buffer in the receiver control system. The CRC is not forwarded to the receiver control system, in this example. The data remains in this buffer until the receiver control system receives a valid or invalid signal indicating whether the data is valid.

To provide this signal, the horizontal CRC generators and the vertical CRC generator each include a checking unit. Each checking unit includes a plurality of OR gates, which are used to OR the latch outputs of its respective generator. These latch outputs include the CRC of that generator. If the result of the OR function is zero, then the respective data is valid. Each generator sends a result of the OR function to the receiver control system. When the receiver control system receives the signals, it determines whether it can proceed. For instance, if the signals indicate, a valid message (e.g., a 0 signal), then the receiver control system is assured that it can use the clear text data in its buffer. If it receives an invalid signal (e.g., 1), then it ignores the data in the buffer.

In a further example, the signals may be collected at the horizontal CRC generator and another OR function is performed with all of the signals. The result of that final OR function is then forwarded to the receiver control system. As yet another example, fewer checking units are used. For instance, a vertical checking unit is not used or one or more horizontal units are not used. It may be that one or more units accept data from multiple latches. Other examples exist.

In a further example, the output of the CRC generators is not forwarded to the receiver control system unless the checking units indicate valid data. Instead, it is buffered in the generators. As a further example, the data portion of the message being input to the vertical CRC generator and the horizontal CRC generator need not be in fixed size packets, but instead, may include a message header that indicates the specific number of bytes for each message. Many other variations also exist without departing from the spirit of the present invention.

Described in detail above are techniques for using cyclic redundancy checks to provide data security. Various advantages of this capability are provided, which include, for instance:

1) Fast computation—Powerful CRC circuits can be implemented in hardware;
2) Low cost—Powerful CRC circuits can be implemented in simple hardware;
3) Low Power—Low-power VLSI could be used for the implementation;
4) Proven technology—Current use of CRC in parallel communication systems for other reasons;
5) Complexity of techniques—Much more security than, for example, parity checks. Feedback nature of the computation leads to complex CRC word;
6) Homogeneous circuitry—generator and receiver circuits are identical, in one embodiment;
7) Retrofitting—existing designs and devices could be retrofit with CRC security circuitry.

Advantageously, one or more aspects of the present invention can be included in a Supervisory Control and Data Acquisition (SCADA) system.

Although various embodiments are described herein, these are only examples. For instance, the provision of a particular number of polynomials and/or number of data bits are only examples. Other numbers of polynomials and/or data bits, as well as other polynomials may be used without departing from the spirit of the present invention. Further, although examples of circuits are provided, other circuits may be implemented without departing from the spirit of the present invention.

Many environments can include and/or use one or more aspects of the present invention. The environments described herein are only examples. For instance, one or more aspects of the present invention can be used for other than utility, power or water facilities. Additionally, the receiver control system can control other than actuators. Further, the transmitter and/or receiver may include additional, less or different components. As one example, there may be no random selection unit. As a further example, there may be more or less horizontal and/or vertical generators, or only one kind of generator. Many other variations exist.

The capabilities of one or more aspects of the present invention can be implemented in software, firmware, hardware or some combination thereof.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Additionally, at least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of providing data security, said method comprising:
    transmitting data from a transmitter to a receiver, wherein the transmitting comprises:
        providing data from a device of the transmitter to a generator of the transmitter, said data comprising a command to control a remote unit;
        randomly selecting, by the generator, in response to receiving the data during transmitting, a plurality of cyclic redundancy check (CRC) polynomials from a set of CRC polynomials to be used to generate a plurality of CRCs, said set of CRC polynomials determined based on a determined degree of desired security for the transmission;
        using the randomly selected plurality of CRC polynomials to generate the plurality of CRCs;
        including the plurality of CRCs in the data being transmitted, wherein the plurality of CRCs determine the security of the data, the security of the data including whether the data being transmitted is being transmitted by an authorized user, wherein a failed CRC check indicates the data is not being transmitted by an authorized user.

2. The method of claim 1, wherein the data is received by the receiver, and wherein the receiver uses the plurality of cyclic redundancy checks to determine the security of the data.

3. The method of claim 2, wherein the transmitter is remote from the receiver.

4. The method of claim 2, wherein the transmitter is in wireless communication with the receiver.

5. The method of claim 2, wherein the receiver includes a control system receiving one or more commands from the transmitter, the transmitter including a field communications device.

6. The method of claim 1, wherein the generator comprises a transmitter CRC generator including multiple horizontal generators to provide multiple horizontal cyclic redundancy checks and at least one vertical generator to provide at least one vertical cyclic redundancy check.

7. The method of claim 6, wherein the transmitter CRC generator is coupled to a random number generator used to randomly select the plurality of CRC polynomials used to generate the plurality of cyclic redundancy checks.

8. The method of claim 1, wherein the data is received by the receiver, said receiver including a receiver CRC generator to decode the data to retrieve the plurality of cyclic redundancy checks used in determining the security of the data.

9. The method of claim 8, wherein the receiver CRC generator comprises multiple horizontal generators and at least one vertical generator used in retrieving the plurality of cyclic redundancy checks from the data.

10. The method of claim 8, wherein the receiver CRC generator is coupled to a random number generator used to select the plurality of CRC polynomials used to retrieve the plurality of cyclic redundancy checks from the data.

11. The method of claim 10, wherein the random number generator coupled to the receiver CRC generator is maintained in step with a random number generator coupled to the generator used to encode the data with the plurality of cyclic redundancy checks, said random number generator coupled to the generator used to select the plurality of CRC polynomials used to generate the plurality of cyclic redundancy checks.

12. The method of claim 1, wherein the command is one of a plurality of types of commands, and wherein the command is of a variable length.

13. The method of claim 7, wherein the random number generator generates a unique number for each horizontal generator of the multiple horizontal generators, and wherein each unique number selects a different CRC polynomial to be used to generate a CRC.

14. The method of claim 1, wherein the plurality of CRCs are used exclusively to determine the security of the data.

* * * * *